(12) United States Patent
Kim et al.

(10) Patent No.: US 8,268,441 B2
(45) Date of Patent: Sep. 18, 2012

(54) LIGHT DIFFUSION MEMBER, BACK LIGHT ASSEMBLY INCLUDING THE SAME AND DISPLAY DEVICE INCLUDING THE SAME

(75) Inventors: Geun-Hyung Kim, Seongnam-si (KR); Jong-Dae Park, Seoul (KR); Tae-Seok Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 13/079,510

(22) Filed: Apr. 4, 2011

(65) Prior Publication Data

US 2011/0176088 A1 Jul. 21, 2011

Related U.S. Application Data

(62) Division of application No. 11/268,027, filed on Nov. 7, 2005, now abandoned.

(30) Foreign Application Priority Data

Nov. 6, 2004 (KR) .................. 2004-90109

(51) Int. Cl.
*B32B 27/18* (2006.01)
*B32B 27/20* (2006.01)
*B32B 27/36* (2006.01)
*G02F 1/1335* (2006.01)
*G02F 1/13357* (2006.01)

(52) U.S. Cl. ......... 428/332; 428/1.6; 428/412; 428/480; 525/418; 525/437; 525/439; 349/61; 349/62; 349/64; 349/112; 359/599

(58) Field of Classification Search ................. None
See application file for complete search history.

(56) References Cited

U.S. PATENT DOCUMENTS

| 4,252,916 | A | | 2/1981 | Mark |
| 4,619,976 | A | | 10/1986 | Morris et al. |
| 4,874,647 | A | * | 10/1989 | Yatsu et al. .................. 428/35.7 |
| 5,237,004 | A | | 8/1993 | Wu et al. |
| 5,342,691 | A | | 8/1994 | Fischer et al. |
| 5,991,077 | A | | 11/1999 | Carlson et al. |
| 6,002,464 | A | | 12/1999 | Fujisawa et al. |
| 6,048,606 | A | | 4/2000 | Bourdelais et al. |
| 6,071,654 | A | | 6/2000 | Camp et al. |
| 6,104,455 | A | * | 8/2000 | Kashima ........................ 349/65 |
| 6,154,262 | A | * | 11/2000 | Ogura ............................ 349/61 |

(Continued)

FOREIGN PATENT DOCUMENTS

EP 111810 A2 5/1983

(Continued)

*Primary Examiner* — Vivian Chen
(74) *Attorney, Agent, or Firm* — Cantor Colburn LLP

(57) ABSTRACT

The light diffusion member includes a light diffusing body and a light diffusing layer. The light diffusing body includes a polymer mixture obtained by uniformly blending a first polymer having a first glass transition temperature and a second polymer having a second transition temperature higher than the first transition temperature. Alternatively, the light diffusing body includes a copolymer prepared from the first and the second polymer. The light diffusing body diffuses an incident light through a light exiting surface. The light diffusing layer is formed on the light exiting surface of the light diffusing body and includes a binder resin having beads. A back light assembly including the light diffusion member and a liquid crystal display device including the light diffusion member exhibit an improved luminance and an improved light diffusing efficiency.

12 Claims, 5 Drawing Sheets

U.S. PATENT DOCUMENTS

| | | | |
|---|---|---|---|
| 6,268,961 B1 | 7/2001 | Nevitt et al. | |
| 6,448,334 B1 | 9/2002 | Verhoogt et al. | |
| 6,513,943 B2 * | 2/2003 | Fukuyoshi | 362/613 |
| 6,517,914 B1 * | 2/2003 | Hiraishi | 428/1.1 |
| 6,524,694 B1 * | 2/2003 | Phillips | 428/323 |
| 6,642,974 B2 * | 11/2003 | Liao | 349/64 |
| 6,677,404 B1 | 1/2004 | Naruse | |
| 6,709,143 B2 * | 3/2004 | Harada et al. | 362/558 |
| 6,769,782 B2 * | 8/2004 | Lee | 362/600 |
| 6,788,359 B2 * | 9/2004 | Lee et al. | 349/65 |
| 6,848,795 B2 | 2/2005 | Kaminsky et al. | |
| 6,856,365 B2 | 2/2005 | Uchida et al. | |
| 6,871,994 B2 | 3/2005 | Harada et al. | |
| 6,890,642 B2 | 5/2005 | Kaminsky et al. | |
| 6,906,761 B2 * | 6/2005 | Nakano | 349/65 |
| 6,909,480 B2 | 6/2005 | Hiraishi et al. | |
| 6,917,396 B2 * | 7/2005 | Hiraishi et al. | 349/64 |
| 6,989,190 B2 | 1/2006 | Gagger et al. | |
| 7,072,115 B2 * | 7/2006 | Uekita et al. | 359/599 |
| 7,156,547 B2 * | 1/2007 | Toshima et al. | 362/618 |
| 7,342,618 B2 * | 3/2008 | Kim | 349/65 |
| 7,379,246 B2 * | 5/2008 | Kim et al. | 359/599 |
| 7,420,739 B2 * | 9/2008 | Kim et al. | 359/599 |
| 7,498,125 B2 | 3/2009 | Quintens | |
| 7,507,470 B2 * | 3/2009 | Kim et al. | 428/323 |
| 7,602,459 B2 * | 10/2009 | Chen et al. | 349/64 |
| 7,872,711 B2 * | 1/2011 | Seo et al. | 349/112 |
| 2001/0019748 A1 * | 9/2001 | Beeson et al. | 428/14 |
| 2003/0018118 A1 | 1/2003 | Burnett | |
| 2003/0143319 A1 * | 7/2003 | Park et al. | 427/64 |
| 2003/0156238 A1 | 8/2003 | Hiraishi et al. | |
| 2004/0113162 A1 * | 6/2004 | Mai | 257/88 |
| 2005/0068628 A1 * | 3/2005 | Masaki | 359/599 |
| 2006/0133109 A1 * | 6/2006 | Kim et al. | 362/615 |

FOREIGN PATENT DOCUMENTS

| | | | |
|---|---|---|---|
| JP | 48-96646 A | | 12/1973 |
| JP | 50083449 U | | 7/1975 |
| JP | 55084975 A | | 6/1980 |
| JP | 02-013925 A | | 1/1990 |
| JP | 06059108 | | 4/1994 |
| JP | 07218705 | | 8/1995 |
| JP | 10-010304 | * | 1/1998 |
| JP | 11271512 A | | 10/1999 |
| JP | 2001-159704 A | | 6/2001 |
| JP | 2004-101641 A | | 4/2004 |
| JP | 2004-235103 | * | 8/2004 |
| KR | 1019990014166 A | | 2/1999 |

* cited by examiner

LIGHT DIFFUSION MEMBER, BACK LIGHT ASSEMBLY INCLUDING THE SAME AND DISPLAY DEVICE INCLUDING THE SAME

This application is a divisional of U.S. application Ser. No. 11/268,027, filed on Nov. 7, 2005 now abandoned, which claims priority to Korean Patent Application No. 2004-90109, filed on Nov. 6, 2004 and all the benefits accruing therefrom under 35 U.S.C. §119, the contents of which in their entirety are herein incorporated by reference.

BACKGROUND OF THE INVENTION

1. Field of the Invention

The present invention relates to a light diffusion member, a back light assembly including the same, a display device including the same, and a copolymer for the light diffusion member. More particularly, the present invention relates to a light diffusion member exhibiting an improved light luminance and an improved light diffusing efficiency with a reduced manufacturing cost, a back light assembly including the same, and a display device including the same.

2. Description of the Related Art

Generally, a display device transforms data having electric signals after being processed by an information processing unit into an image. A liquid crystal display device is one type of display device and displays an image utilizing an electric characteristic and an optical characteristic of liquid crystal.

The liquid crystal display device includes a liquid crystal display panel and a device for providing light to display the image. Light generated from the device for providing light passes through liquid crystal included in the liquid crystal panel to display the image on the liquid crystal display panel.

The quality of the displayed image on the liquid crystal display device is largely dependent on the luminance and luminance uniformity of the light generated from the device for providing light.

In order to improve the luminance and the luminance uniformity of the image, an optical membrane is provided between the device for providing light and the liquid crystal display panel. The optical membrane improves the uniformity of the luminance and the luminance uniformity of the light generated from the device for providing light to improve the quality of the image displayed on the liquid crystal display panel.

A diffusion member, such as a diffusion plate and a diffusion sheet, is used to induce the diffusion of light. The diffusion plate is commonly used in a liquid crystal display device for a television set, and the diffusion sheet is generally provided on the diffusion plate. The diffusion plate is generally manufactured using polymethyl methacrylate ("PMMA"). This material functions to induce a light diffusing phenomenon when the light passes there through to increase the uniformity of the non-uniform light luminance of the light from a light source to some degree. In general, the diffusion sheet includes PMMA beads coated on a base matrix and diffuses light. The base matrix is generally obtained by using polyethylene terephthalate ("PET").

However, the PET based material of the base matrix is affected when the diffusion plate is deformed. Also, the PET base itself might be deformed due to an applied heat that might then induce a wrinkling phenomenon of the diffusion sheet.

In addition, the light diffusion member including the diffusion plate and the diffusion sheet according to the conventional method might generate luminance loss due to an air gap present between the diffusion plate and the diffusion sheet.

BRIEF SUMMARY OF THE INVENTION

The present invention provides a light diffusion member providing an improved light luminance and an improved light diffusing efficiency, preventing a wrinkling phenomenon, and reducing the manufacturing cost.

The present invention also provides a back light assembly including the above light diffusion member.

The present invention still also provides a liquid crystal display device including the above light diffusion member.

The present invention still also provides a copolymer applicable for the above light diffusion member.

In accordance with an exemplary embodiment of the present invention, there is provided a light diffusion member including a light diffusing body and a light diffusing layer. The light diffusing body includes a polymer mixture obtained by uniformly blending a first polymer having a first glass transition temperature and a second polymer having a second transition temperature higher than the first transition temperature. The light diffusing body diffuses an incident light through a light exiting surface of the light diffusing body. The light diffusing layer is formed on the light exiting surface of the light diffusing body and includes a binder resin having beads.

In accordance with another exemplary embodiment of the present invention, there is provided a light diffusion member including a light diffusing body and a light diffusing layer. The light diffusing body includes a polymer mixture of polyethylene terephthalate/polycarbonate obtained by uniformly blending polyethylene terephthalate and polycarbonate. The light diffusing body diffuses incident light through a light exiting surface of the light diffusing body. The light diffusing layer is formed on the light exiting surface of the light diffusing body and includes a binder resin including beads.

In accordance with still another exemplary embodiment of the present invention, there is provided a light diffusion member including a light diffusing body and a light diffusing layer. The light diffusing body includes a polymer mixture obtained by uniformly blending a plurality of polymers. The light diffusing body diffuses an incident light towards a light exiting surface of the light diffusing body. The light diffusing layer is formed on the light exiting surface of the light diffusing body and includes a binder resin having beads.

In accordance with still another exemplary embodiment of the present invention, there is provided a light diffusion member including a light diffusing body and a light diffusing layer. The light diffusing body includes a copolymer having a first polymer having a first glass transition temperature and a second polymer having a second glass transition temperature higher than the first glass transition temperature. The first and second polymers are arranged as repeating units. The light diffusing body diffuses an incident light through a light exiting surface of the light diffusing body. The light diffusing layer is formed on the light exiting surface of the light diffusing body and includes a binder resin having beads.

In accordance with still another exemplary embodiment of the present invention, there is provided a light diffusion member including a light diffusing body and a light diffusing layer. The light diffusing body includes a copolymer including polyethylene terephthalate and polycarbonate as repeating units. The light diffusing body diffuses an incident light through a light exiting surface. The light diffusing layer is formed on the light exiting surface of the light diffusing body and includes a binder resin having beads.

In accordance with still another exemplary embodiment of the present invention, there is provided a light diffusion member including a light diffusing body and a light diffusing layer. The light diffusing body includes a copolymer including a plurality of polymers as repeating units. The light diffusing body diffuses an incident light through a light exiting surface. The light diffusing layer is formed on the light exiting surface of the light diffusing body and includes a binder resin having beads.

In accordance with still another exemplary embodiment of the present invention, there is provided a copolymer for a light diffusion member, the copolymer including a first repeating unit of at least one polymer selected from a group consisting of polyethylene terephthalate, polybutylene terephthalate, and polyethylene naphthalate and a second repeating unit of at least one polymer selected from a group consisting of polycarbonate, cyclic olefin copolymer, and polymethyl methacrylate in a mixing ratio of 2-4:6-8 by weight. The copolymer has a glass transition temperature in a range of from about 100 to about 125° C.

In accordance with still another exemplary embodiment of the present invention, there is provided a back light assembly including a receiving container, a light source generating light, the light source received in the receiving container, and a light diffusion member provided on the light source and including a light diffusing body and a light diffusing layer. The light diffusing body includes a polymer mixture obtained by uniformly blending a first polymer having a first glass transition temperature and a second polymer having a second glass transition temperature higher than the first glass transition temperature. The light diffusing body diffuses an incident light through a light exiting surface of the light diffusing body. The light diffusing layer is formed on the light exiting surface of the light diffusing body and includes a binder resin having beads.

In accordance with still another exemplary embodiment of the present invention, there is provided a back light assembly including a receiving container, a light source generating light, the light source received in the receiving container, and a light diffusion member provided on the light source and including a light diffusing body and a light diffusing layer. The light diffusing body includes a copolymer including a first polymer having a first glass transition temperature and a second polymer having a second glass transition temperature higher than the first glass transition temperature as repeating units. The light diffusing body diffuses an incident light through a light exiting surface of the light diffusing body. The light diffusing layer is formed on the light exiting surface of the light diffusing body and includes a binder resin having beads.

In accordance with still another exemplary embodiment of the present invention, there is provided a liquid crystal display device including a back light assembly and a display unit provided on a light diffusion member of the back light assembly, the display unit changing diffused light into an image light including information. The back light assembly includes a receiving container, a light source generating light, the light source received in the receiving container, and a light diffusion member provided on the light source and including a light diffusing body and a light diffusing layer. The light diffusing body includes one of a polymer mixture obtained by uniformly blending a first polymer having a first glass transition temperature and a second polymer having a second glass transition temperature higher than the first glass transition temperature and a copolymer of the first polymer and the second polymer as repeating units. The light diffusing body diffuses an incident light through a light exiting surface of the light diffusing body. The light diffusing layer is formed on the light exiting surface of the light diffusing body and includes a binder resin having beads.

According to the light diffusion member of the present invention, a light luminance and a light diffusing efficiency of a liquid crystal display device including the light diffusion member can be improved and a wrinkling phenomenon of the light diffusion member may be prevented. In addition, the manufacturing cost of the liquid crystal display device may be reduced.

BRIEF DESCRIPTION OF THE DRAWINGS

The above and other features and advantages of the present invention will become more apparent by describing in detailed exemplary embodiments thereof with reference to the accompanying drawings, in which.

DETAILED DESCRIPTION OF THE INVENTION

Figure 1:
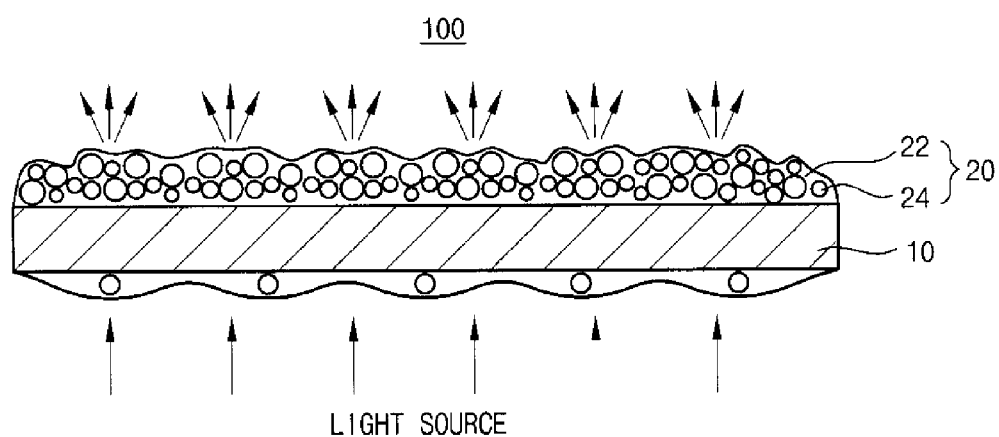
FIG. 1 is a schematic cross-sectional view showing an exemplary embodiment of a light diffusion member according to the present invention.

The present invention now will be described more fully hereinafter with reference to the accompanying drawings, in which exemplary embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of layers, films, and regions are exaggerated for clarity. Like reference numerals refer to similar or identical elements throughout. It will be understood that when an element such as a layer, film, region, or substrate is referred to as being "on" another element, it can be directly on the other element or intervening elements may also be present.

Light Diffusion Member

Embodiment 1

FIG. 1 is a schematic cross-sectional view showing an exemplary embodiment of a light diffusion member according to the present invention.

Referring to FIG. 1, a light diffusion member 100 includes a light diffusing body is 10 and a light diffusing layer 20 formed on the light diffusing body 10. The light diffusion member 100 diffuses incident light from a light source 50 through a light exiting surface of the light diffusing body 10, where the light exiting surface may be a layer of the light diffusing body 10, or may simply be the outermost surface of the light diffusing body 10 that faces the light diffusing layer 20. The light diffusion member 100 includes a polymer mixture obtained by uniformly blending a first polymer and a second polymer.

Through the blending, two or more polymers having different physical properties are uniformly mixed in a predetermined mixing ratio. A complex material having a novel physical property can be prepared through the blending process. The blending process is preferably implemented until a uniform product is obtained. When the mixture is non-uniformly blended, the glass transition temperature or a humidity absorbance of the polymer mixture is not constant and thus the obtained mixture would not be made commercially available.

The polymers are preferably selected so that the polymer mixture exhibits a high glass transition temperature and a low humidity absorbance. Different polymers having complementary properties can be selected to optimize the desired properties of the polymer mixture. In addition, the price of each polymer also might be considered as a factor in determining which polymers to utilize in the polymer mixture. The preferred glass transition temperature of the polymer mixture is about 100° C. or higher. The glass transition temperature of polymethyl methacrylate ("PMMA") included in the conventional light diffusing body is about 104° C. Accordingly, a polymer mixture of which the glass transition temperature is at least 100° C. or higher is required for the manufacture of the light diffusing body 10 in place of the conventional light diffusing body of PMMA.

For the first polymer and the second polymer included in the polymer mixture, is polymers producing a polymer mixture having a glass transition temperature of 100° C. or higher and a lower humidity absorbance than PMMA through the blending process can be used. In an exemplary embodiment, the first polymer includes a polyester-based polymer such as polyethylene terephthalate ("PET"), polyethylene naphthalate, and polybutylene terephthalate. The polyester-based first polymer has an advantage of having a low humidity absorbance. The second polymer includes polycarbonate ("PC"), cyclic olefin copolymer ("COC"), polymethyl methacrylate, and the like. The glass transition temperature of the first polymer is about 70 to about 80° C. and the glass transition temperature of the second polymer is about 130 to about 150° C. The first and second polymers are blended in a predetermined mixing ratio to prepare the polymer mixture having the glass transition temperature of about 100° C. or higher.

The light diffusing layer 20 includes a binder resin 22 having a plurality of beads 24 distributed throughout the binder resin 22. The beads 24 are formed using PMMA, PET, etc. For the binder resin, an acryl-based resin such as PMMA can be used.

The light diffusing body 10 is manufactured as follows. The first polymer and the second polymer are blended in a blending apparatus and then the obtained product is cooled. The cooled product is extruded and cut to a predetermined shape, such as, but not limited to, a rectangular plate shape. The thickness of the formed light diffusing body 10 is set when the light diffusing body 10 is passed through a T-Die after the blending. The preferred thickness of the light diffusing body is from about 0.7 to about 1.2 mm. When the thickness of the light diffusing body 10 is less than 0.7 mm, the elastic modulus of the light diffusing body 10 is too low and a surface wrinkling due to the contraction of the material may be generated. When the thickness of the light diffusing body 10 exceeds 1.2 mm, a curvilinear motion of the light diffusing body 10 while moving on a roll for coating the light diffusing layer 20 becomes difficult.

On the light diffusion member 100, such as on the light diffusing body 10, an adhesion preventing layer facing the light exiting surface of the light diffusing body 10 may be formed. The adhesion preventing layer functions to prevent the slip of the light diffusing body 10 while moving on the roll for coating the light diffusing layer 20. The adhesion preventing layer may be formed using PMMA, PET, and the like.

The light diffusing body 10 is preferably formed using a PET/PC polymer mixture obtained by uniformly blending PET with PC.

PC is prepared by using a solvent polymerization method. According to the solvent polymerization method, a reaction proceeds at an interface of an aqueous layer in which bisphenol A ("BPA") is dissolved and an organic solvent layer in which phosgene ("CDC") is dissolved, under the presence of an acid binder and a solvent.

The polymer mixture includes about 20-40% by weight of PET and about 60-80% by weight of PC. The mixing ratio is determined by considering the high humidity absorbance of PET and the high glass transition temperature of PC. The glass transition temperature of the PET/PC polymer mixture is calculated by following Equation 1.

$$T_g = (T_{g1}T_{g2})/(w_1 T_{g2} + w_2 T_{g1})$$ [Equation 1]

In Equation 1, $T_g$, $T_{g1}$ and $T_{g2}$ respectively represent the glass transition temperature $T_g$ of the polymer mixture, the glass transition temperature $T_{g1}$ of the first polymer, and the glass transition temperature $T_{g2}$ of the second polymer. $W_1$ and $W_2$ represent the weight percents of the first polymer and the second polymer, respectively.

The glass transition temperature $T_{g1}$ of PET is about 78° C. and the glass transition temperature $T_{g2}$ of PC is about 140° C. Accordingly, the glass transition temperature $T_g$ of the PET/PC polymer mixture obtained by mixing 20% by weight of PET and 80% by weight of PC is approximately 116° C. Because this temperature $T_g$ is higher than the glass transition temperature of PMMA, about 104 to 106° C., the probability of generating deformation due to heat, etc. can be reduced. In addition, since this PET/PC polymer mixture includes PET having very low humidity absorbance, the durability thereof is very good.

When considering the humidity absorbance of the PET/PC polymer mixture, the preferred glass transition temperature $T_g$ is about 100-121° C.

While, thus far, the polymer mixture in the light diffusing body 10 has been described as including a first polymer and a second polymer, the polymer mixture included in the light diffusing body 10 might include three or more polymers. Each polymer may have different glass transition temperatures and humidity absorbances from one another. Preferably, polymers that give a polymer mixture having an optimized glass transition temperature $T_g$, humidity absorbance, and lower cost are selected.

Referring again to FIG. 1, the light diffusing layer 20 is formed on the light diffusing body 10 by means of a coating method. According to this embodiment, the light diffusing layer 20 is directly coated on the light diffusing body 10 by means of the coating method to produce the light diffusion member 100 and thus does not require a base matrix as part of the light diffusion member 100. Therefore, the wrinkling phenomenon due to a deformation of the base matrix is not generated in the light diffusion member 100. That is, in the light diffusion member 100, the light diffusing body 10 and the light diffusing layer 20 are formed in one integrally body, as a solitary unit rather than as separate sheets. Therefore, the manufacturing efficiency is improved and the unit manufacturing cost is reduced. Also, the thickness of the liquid crystal display device may be reduced and a gap between the light diffusing body 10 and the light diffusing layer 20 is eliminated.

EXAMPLE 1

Manufacture of PET/PC Light Diffusing Body 0.4 ton of chip-shaped PET and 1.6 ton of PC were put into a blending apparatus, a twin screw extruder manufactured by Killon Co., Ltd. The PET and PC were then blended at a temperature of 280° C. Then, the blended product was extruded, allowed to pass through a T-die, and then cooled in a cooling apparatus to a temperature of 30° C. The extruded and cooled light diffusing body was transported on a roll and cut to a desired size.

Embodiment 2

The light diffusion member 100 according to this present embodiment includes the same components described in Embodiment 1 except utilizes a different arrangement for the light diffusing body 10. Therefore, the same reference numerals are given to the same components and repeated explanation will be omitted.

The light diffusion member 100 according to this embodiment includes a copolymer within the light diffusing body 10 having the first and the second polymers arranged as repeating units. That is, for example, instead of blending the first and second polymers to form a polymer mixture as in Embodiment 1, at least one layer of the first polymer and at least one layer of the second polymer form the light diffusing body 10. The copolymer exhibits an improved stability or uniformity of physical properties such as glass transition temperature and humidity absorbance, when compared with the polymer mixture prepared by Example 1.

The second polymer preferably has a higher glass transition temperature ($T_{g2}$) and a higher humidity absorbance than the first polymer. The preferred glass transition temperature $T_g$ of the copolymer is about 100° C. or higher. The glass transition temperature of PMMA included in the conventional light diffusing body is about 104° C. Therefore, in order to replace PMMA for the preparation of the light diffusing body 10, a copolymer having a glass transition temperature of at least 100° C. is required.

For the first and the second polymers, polymers producing a copolymer having the glass transition temperature $T_g$ of about 100° C. or higher and the humidity absorbance lower than that of PMMA can be used. As the first polymer, polyester-based polymer such as PET, polyethylene naphthalate, and polybutylene terephthalate can be used. Also, as the second polymer, PC, cyclic olefin copolymer, and PMMA, and the like can be used. The preferred glass transition temperature $T_{g1}$ of the first polymer is about 70-80° C. and the preferred glass transition temperature $T_{g2}$ of the second polymer is about 130-150° C. Preferably, a copolymer including the two polymers as repeating units having the glass transition temperature of about 100° C. or higher is used.

The light diffusing body 10 preferably includes the copolymer including PET and PC as repeating units.

The repeating units of PET and PC are linearly arranged in a mixing ratio of 2-4:6-8 by weight. The units, or layers, of the polymers may have varying thicknesses. The mixing ratio by weight is determined so that the high humidity absorbance of PET and the high glass transition temperature of PC can be maximized. The transition temperature $T_g$ of the copolymer can be calculated by following Equation 1.

$$T_g = (T_{g1}T_{g2})/(w_1 T_{g2} + w_2 T_{g1})$$ [Equation 1]

In the equation 1, $T_g$, $T_{g1}$ and $T_{g2}$, respectively, represent the glass transition temperature $T_g$ of the copolymer, the glass transition temperature $T_{g1}$ of the first polymer, and the glass transition temperature $T_{g2}$ of the second polymer. $W_1$ and $W_2$, respectively, represent the weight percents of the first polymer and the second polymers repeated in the copolymer.

The glass transition temperature $T_{g1}$ of PET is about 78° C. and the glass transition temperature $T_{g2}$ of PC is about 140° C. When the copolymer includes 20% by weight of PET and 80% by weight of PC, the glass transition temperature $T_g$ of the copolymer becomes approximately 116° C. according to the above-described Equation 1. Since this temperature $T_g$ is higher than the glass transition temperature of PMMA, which is about 104 to 106° C., the probability of deformation due to heat can be reduced. In addition, since the physical property of PET having a very low humidity absorbance is exhibited, the durability thereof is also very good.

The glass transition temperature $T_g$ of the PET/PC copolymer is preferably in the range of about 100 to 121° C. when considering the humidity absorbance.

The light diffusing body 10 may also include a copolymer having three or more polymers arranged as repeating units or layers according to this embodiment. Each polymer exhibits a different glass transition temperature $T_g$ and humidity absorbance. By considering the properties of polymers, appropriate polymers giving the copolymer an optimized glass transition temperature $T_g$ and humidity absorbance are selected.

Copolymer for Light Diffusion Member

The copolymer for the light diffusion member 100 includes the first repeating unit of PET, polyethylene naphthalate, or polybutylene terephthalate and the second repeating unit of PC, cyclic olefin copolymer, or PMMA, and the first and second repeating units are arranged repeatedly, that is, there may be a plurality of each repeating unit or layer provided within the copolymer and the first and second repeating units may be alternatingly arranged in a pattern or irregularly. The copolymer includes the first polymer and the second polymer in a mixing ratio of 2-4:6-8 by weight and has a glass transition temperature of about 100-125° C.

The molecular weight of the copolymer for the light diffusion member 100 is about 10,000 to 100,000. The humidity absorbance of the copolymer is about 0.01-1.0%.

The preferred copolymer for the light diffusion member is a block copolymer including the first repeating unit of PET and the second repeating unit of PC in a mixing ratio of 2:8 by weight, and the first and second repeating units are arranged repeatedly and irregularly. The glass transition temperature $T_g$ of the block copolymer is about 116° C. and the molecular weight thereof is about 10,000 to 100,000.

Since the copolymer has a higher glass transition temperature $T_g$ and a lower humidity absorbance than the conventionally used PMMA, the probability of deformation of the light diffusion member 100 due to heat and the change of the physical properties due to humidity may be reduced, thereby improving the performance of the light diffusion member 100.

Back Light Assembly

Embodiment 3

Figure 2:
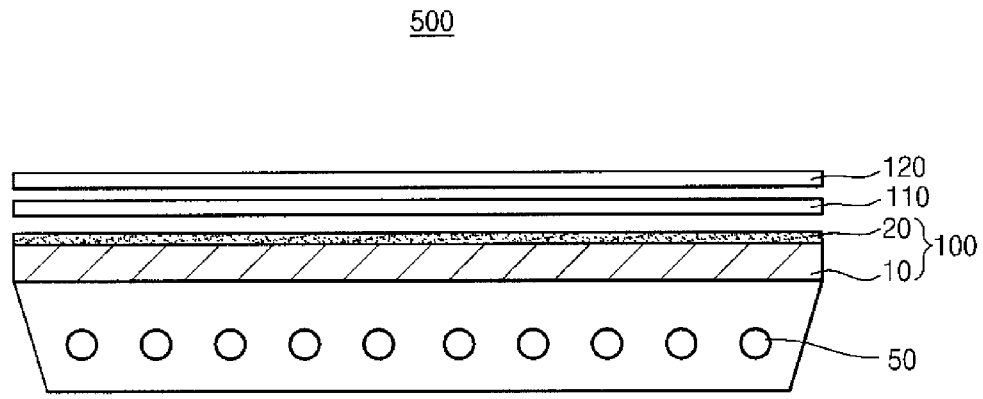
FIG. 2 is a schematic cross-sectional view showing an exemplary embodiment of a back light assembly according to the present invention.

FIG. 2 is a schematic cross-sectional view showing an exemplary embodiment of a back light assembly according to the present invention.

Referring to FIG. 2, a back light assembly 500 includes a receiving container (not shown), a light source 50 and a light diffusion member 100. In this embodiment, a plurality of vertically downward radiating lamps is used as the light source 50, however other types of lamps and lamp arrangements are within the scope of these embodiments. The light source 50 is received in the receiving container and generates light to radiate the light to the light diffusion member 100. The light diffusion member 100 includes a light diffusing body 10 and a light diffusing layer 20. Since the light diffusion member 100 in this embodiment is illustrated and described with respect to FIG. 1 and Embodiment 1, the same reference numerals are given to the same components of the light diffusion member 100 and the same explanation of the components will be omitted.

The back light assembly 500 further includes a light collecting member 110 and a passivation layer 120. The light collecting member 110 is provided on the light diffusion member 100. The light collecting member 110 refracts light passed through the light diffusion member 100 and collects the light toward a displaying unit (not shown). Therefore, the light collecting member 110 improves a front side luminance. The passivation layer 120 is provided on the light collecting member 110 and physically protects the light collecting member 110.

As the light source 50, an edge-type lamp may alternatively be used.

Embodiment 4

A back light assembly according to this embodiment includes the same components as described with respect to Embodiment 3 except for a different light diffusion member 100. Accordingly, the explanation on the same components will be omitted.

The back light assembly 500 according to this embodiment includes the light diffusion member 100. The light diffusion member 100 includes the light diffusing body 10 including the copolymer described in Embodiment 2.

Liquid Crystal Display Device

Embodiment 5

Figure 3:
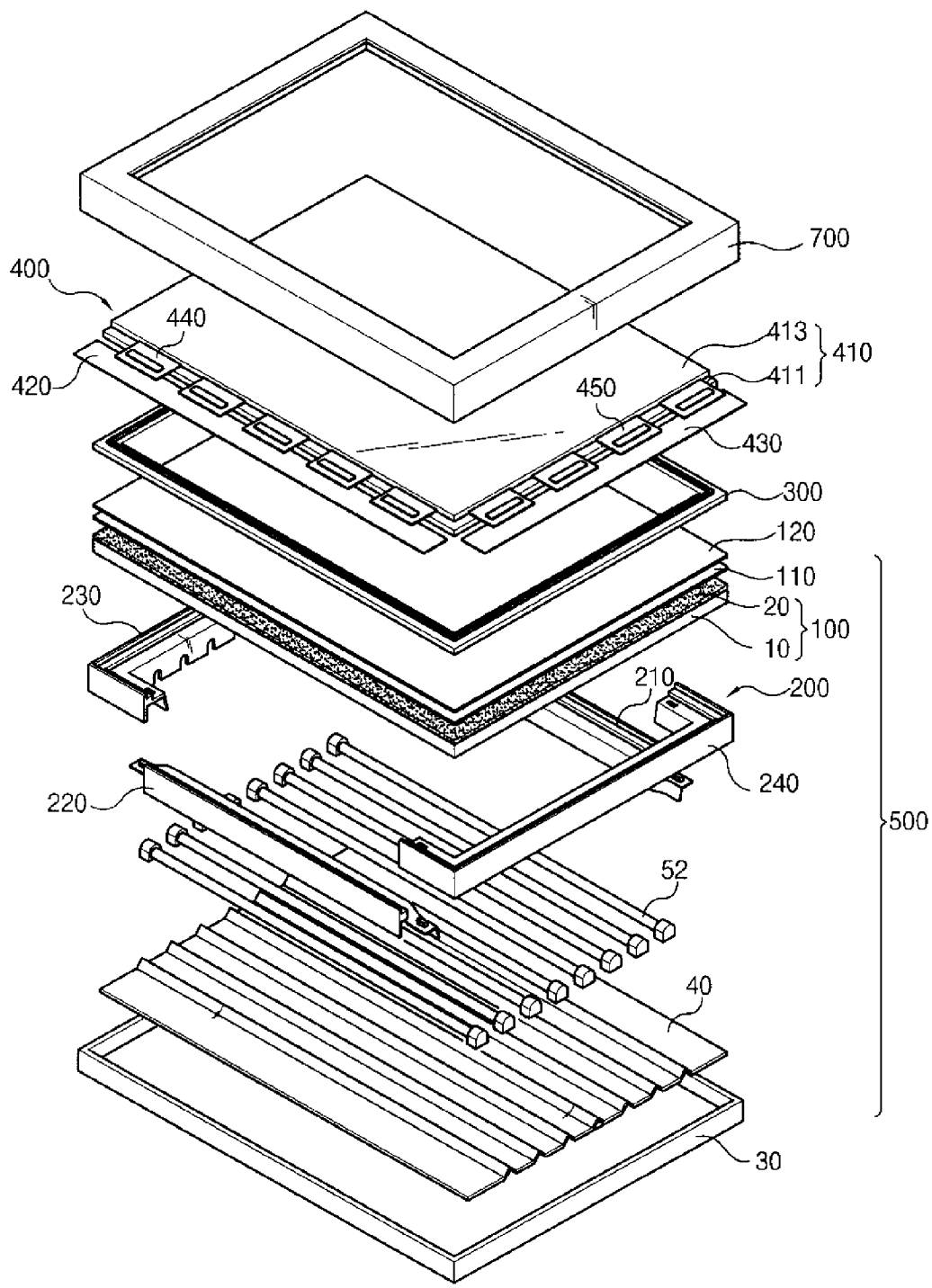
FIG. 3 is an exploded perspective view showing an exemplary embodiment of a liquid crystal display device according to the present invention.

FIG. 3 is an exploded perspective view showing an exemplary embodiment of a liquid crystal display device according to the present invention. The explanation of the light diffusion member 100 will be omitted and the same reference numerals are given to the same components because the same light diffusion member 100 illustrated in FIG. 1 and described with respect to Embodiments 1 and 2 is used.

Referring to FIG. 3, a liquid crystal display device 1000 includes a display unit 400 for displaying an image by an applied image signal and a back light assembly 500 for providing light to the display unit 400.

The display unit 400 includes a liquid crystal display panel 410, a data printed circuit board 420, a gate printed circuit board 430, a data tape carrier package ("TCP") 440, and a gate TCP 450. The liquid crystal display panel 410 includes a TFT substrate 411 and a color filter substrate 413, and liquid crystal (not shown) is injected between the TFT substrate 411 and the color filter substrate 413.

The TFT substrate 411 is a transparent glass substrate on which TFTs (not shown) are formed in a matrix shape. Although not illustrated for clarity, a data line is connected to a source terminal of the TFT, and a gate line is connected to a gate terminal thereof. To a drain terminal, a pixel electrode includes a transparent and conductive material such as, but not limited to, indium tin oxide ("ITO"). When an electric signal is inputted to the data line and the gate line, the electric signal is inputted into the source terminal and the gate terminal of the TFT. According to the input of the electric signal, the TFT is turned-on or turned-off to output an electric signal necessary to form a pixel through the drain terminal.

The color filter substrate 413 is a substrate on which color pixels of red, blue, and green ("RGB") pixels are formed for illustrating predetermined color when the light transmits. The front surface of the color filter substrate 413 is coated with a common electrode including a transparent and conductive material such as, but not limited to, ITO.

When an electric power is applied to the gate terminal and the source terminal of the transistor of the TFT substrate 411 and the TFT is turned-on, an electric field is formed between the pixel electrode of the TFT substrate 411 and the common electrode of the color filter substrate 413. When the electric field is formed, the arranging angle of the liquid crystal injected between the TFT substrate 411 and the color filter substrate 413 is changed so that the transmissivity of the liquid crystal is also changed to accomplish a desired pixel.

As shown in the figures, a data TCP for determining the applying time of a data driving signal is attached to the data line of the liquid crystal display panel 410, and a gate TCP 450 for determining the applying time of a gate driving signal is attached to the gate line. The data printed circuit board 420 connects to the data TCP 440, receives external image signals of the liquid crystal display panel 410, and applies a driving signal to the data line. The gate printed circuit board 430 connects to the gate TCP 450 and applies a driving signal to the gate line.

In FIG. 3, the liquid crystal display device 1000 separately includes the data printed circuit board 420 and the gate printed circuit board 430. However, the liquid crystal display device 1000 may alternatively include a combined printed circuit board (not shown) of the data printed circuit board 420 and the gate printed circuit board 430.

The back light assembly 500 includes a plurality of lamps 52 as the light source 50, a reflecting plate 40, a light diffusion member 100, a light collecting member 110, a passivation layer 120 for protecting the light collecting member 110, and a receiving container 30 for receiving the above components. In particular, the lamps 52 generate light, and the light diffusion member 100 is provided on the light source 50 to diffuse the light provided from the light source 50 to output light having uniform luminance. The light collecting member 110 collects the diffused light from the light diffusion member 100 toward a display unit 400.

The liquid crystal display device 1000 includes a lower mold frame 200 and an upper mold frame 300. The lower mold frame 200 includes two or more lower mold frame members 210, 220, 230, and 240 and the lower mold frame members 210, 220, 230, and 240 are combined to form a rectangular frame shape. In the lower mold frame 200, a plurality of lamps 52 are received in parallel and within a stepped portion formed on the lower mold frame 200. The light diffusion member 100, the light collecting member 110, and the passivation layer 120 are placed on the stepped portion of the lower mold frame 200. The upper mold frame 300 is placed on the passivation layer 120. The upper mold frame 300 has a rectangular shape and presses the light diffusion member 100, the light collecting member 110, and the passivation layer 120 towards the lower mold frame 200. In addition, the liquid crystal display panel 410 is placed on the upper mold frame 300 for a stable support. On the liquid crystal display panel 410, a top chassis 700 is provided.

The light diffusing body 10 of the light diffusion member 100 of the liquid crystal display device 1000 may include either the polymer mixture prepared as described with respect to Embodiment 1 or the copolymer prepared as described with respect to Embodiment 2.

Performance Test of Light Diffusion Member

For the light diffusion member 100 having a thickness of about 0.8 mm and including the polymer mixture prepared by the Example 1, haze value, transparency, diffraction degree, and straight light ratio were evaluated and the results are illustrated in Table 1.

COMPARATIVE EXAMPLE 1

A conventional light diffusing body was used as Comparative Example 1. The light diffusing body included a diffusion plate having a thickness of about 2 mm and comprised PMMA and a diffusing sheet formed by coating PMMA beads on a base matrix formed using PET.

The haze value was calculated using the following equation.

HAZE VALUE=(diffused and transmitted amount of light/total transmitted amount of light)×100    [Equation 2]

TABLE 1

| Item | Example 1 | Comparative Example 1 |
|---|---|---|
| Haze value (%) | 93.3 | 93.4 |
| Transparency (%) | 62.76 | 47.99 |
| Diffraction degree (%) | 58.56 | 58.26 |
| Straight light ratio (%) | 4.2 | 3.17 |

Referring to Table 1, the light diffusion member of the present invention exhibits similar optical characteristics when compared with PMMA and even better result for the transparency and diffraction degree.

Measurements on Elastic Modulus

Figure 4:
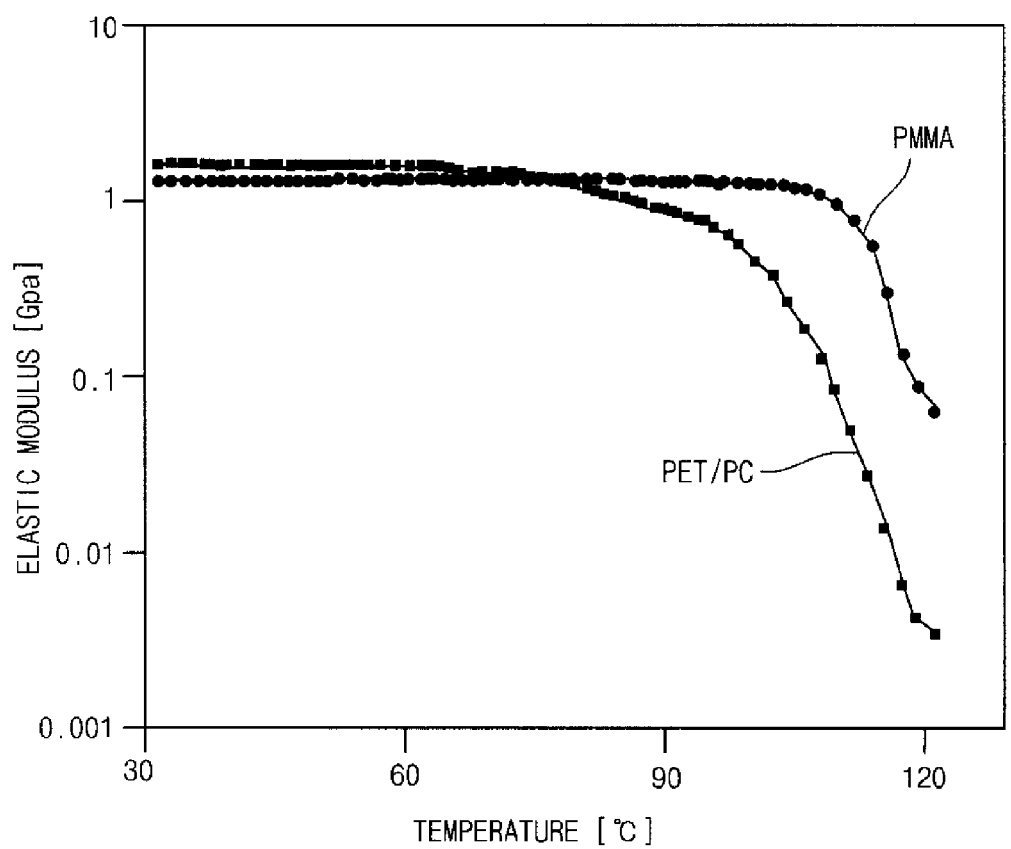
FIG. 4 is a graph illustrating an exemplary embodiment of the change in the elastic modulus of PET/PC polymer mixture with respect to the temperature according to the present invention.

FIG. 4 is a graph illustrating an exemplary embodiment of the change in elastic modulus of PET/PC polymer mixture with respect to the temperature according to the present invention.

In order to measure the elastic modulus, the light diffusing body 10 including the PET/PC polymer mixture prepared by Example 1 was used. As a control, the diffusing plate manufactured by Comparative Example 1 was used.

The elastic modulus was measured using a dynamic mechanical thermal analyzer (vibration number 1 hz, strain 1%).

Generally, the bending stiffness of a material is proportional to $Et^3$ of a plate-shaped structure, where E represents the elastic modulus of a material and t represents the thickness of the material. Accordingly, as the thickness and elastic modulus decrease, the stiffness also decreases. When the stiffness is small, not much force is applied when contacting with the display panel 410 of the liquid crystal display device 1000, thereby reducing the generation of strain on the panel.

Referring to FIG. 4, since the degree of lowering of the elastic modulus according to the increase of temperature is weak for PET/PC when comparing with PMMA, the stiffness of PET/PC is large when considering the elasticity. However, when considering the thickness, the stiffness is small and so the generation of strain of the panel is relatively small.

Measurements on the Changing Ratio of Glass Transition Temperature

Figure 5:
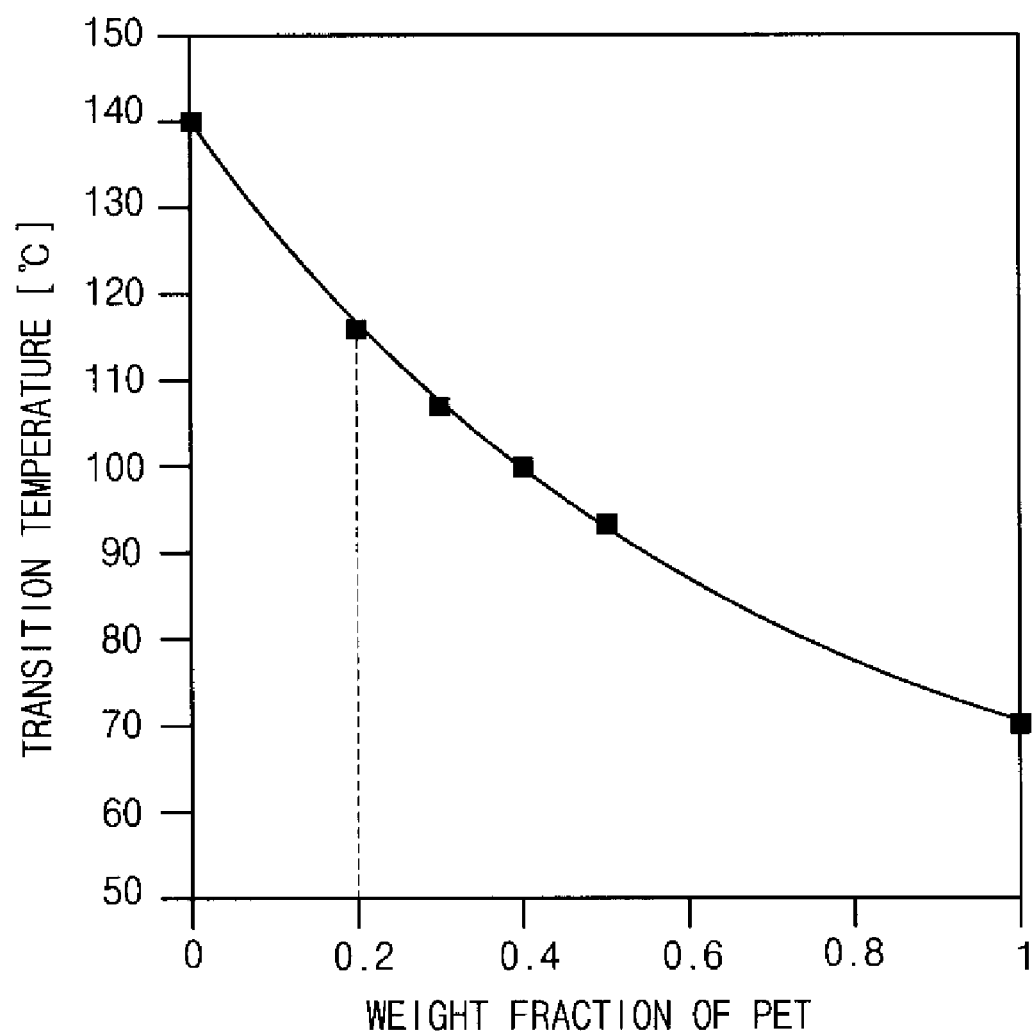
FIG. 5 is a graph illustrating an exemplary embodiment of the change in a glass transition temperature of a PET/PC polymer mixture in the light diffusing body with respect to PET weight fraction according to the present invention.

FIG. 5 is a graph illustrating an exemplary embodiment of the change of a glass transition temperature $T_g$ of a PET/PC polymer mixture in the light diffusing body 10 with respect to PET weight fraction according to the present invention.

Referring to FIG. 5, the glass transition temperature $T_g$ of the PET/PC polymer mixture decreases as the amount of PET increases. When the amount of PET increases, the humidity absorbance increases, however, the deformation due to external heat becomes easier. Therefore, the preferred amount of PET is about 20% by weight. As shown in FIG. 5, the glass transition temperature $T_g$ of the polymer mixture is about 116° C. when the amount of PET is 20%. This temperature is higher than the glass transition temperature of PMMA, about 106° C. Therefore, the heat resistance of the light diffusing body 10 of the present invention is better than that of the conventional light diffusing plate.

Measurements on Heat Absorbing Amount

Figure 6:
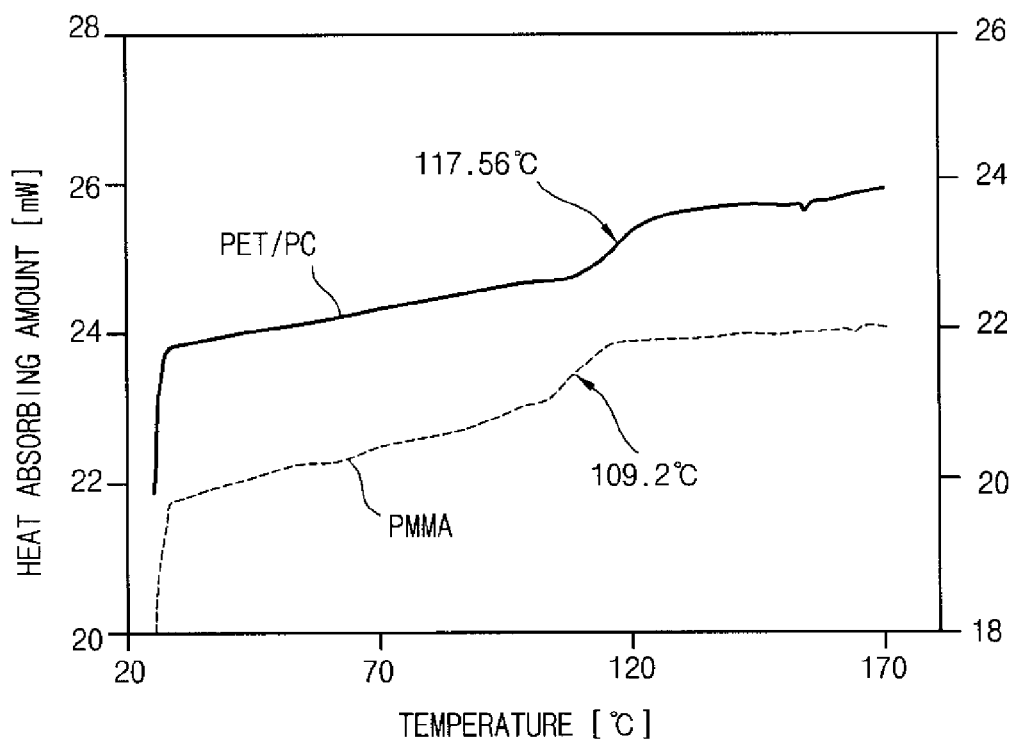
FIG. 6 is a graph illustrating an exemplary embodiment of a heat absorbing amount of a PET/PC polymer mixture in the light diffusing body according to the present invention.

FIG. 6 is a graph illustrating an exemplary embodiment of a heat absorbing amount of a PET/PC polymer mixture in the light diffusing body 10 according to the present invention.

In order to measure the heat absorbing amount, the light diffusing body 10 including a PET/PC polymer mixture prepared by Example 1 was used. As a control, the PMMA light diffusing plate manufactured by the Comparative Example 1 was used.

The temperature of the point of inflection for PMMA was about 109.2° C. and that of the PET/PC polymer mixture was about 117.6° C. The temperature of the point of inflection corresponds to the glass transition temperature $T_g$ of each material.

As opposed to the conventional light diffusion member that includes a light diffusing plate separate from a diffusing sheet, the light diffusion member 100 of the present invention includes the components in one body, such as one body formed in a solitary unit. Therefore, the efficiency of the manufacturing process is improved and the manufacturing cost is lowered.

Since the light diffusion member of the present invention is thinner than the conventional light diffusing plate, the manufacturing of a thinner liquid crystal display device can be accomplished. Also, the light transparency is good and the luminance can be improved.

In addition, the light diffusion member of the present invention has a good durability with respect to heat or humidity. In particular, since the light diffusion member has a high glass transition temperature, the deformation thereof due to heat is rarely generated. Accordingly, the wrinkling phenomenon exhibited by the conventional diffusing sheet can be effectively prevented.

Further, a problem of a luminance loss due to an air gap between a diffusing plate and a diffusing sheet can be prevented.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A back light assembly comprising:
   a receiving container;
   a light source generating light, the light source received in the receiving container; and
   a light diffusion member provided on the light source and including a light diffusing body, an adhesion preventing layer and a light diffusing layer formed on a light exiting surface of the light diffusing body,
   the light diffusing body including a polymer mixture having a first polymer having a first glass transition temperature and a second polymer having a second glass transition temperature higher than the first glass transition temperature, the first and second polymers uniformly blended within the polymer mixture, the light diffusing body diffusing an incident light through a light exiting surface of the light diffusing body, the adhesion preventing layer formed on the light exiting surface of the light diffusing body, wherein the light diffusing layer includes a binder resin having beads.

2. The back light assembly as claimed in claim 1, wherein the first polymer is polyethylene terephthalate and the second polymer is polycarbonate.

3. The back light assembly as claimed in claim 2, wherein the polymer mixture includes about 20-40% by weight of polyethylene terephthalate and about 60-80% by weight of polycarbonate.

4. The back light assembly as claimed in claim 1, wherein a glass transition temperature of the polymer mixture is about or greater than 100° C.

5. The back light assembly as claimed in claim 1, wherein a thickness of the light diffusing body is in a range of from about 0.7 to about 1.2 mm.

6. The back light assembly as claimed in claim 1, further comprising a light collecting member improving a front side luminance and a passivating layer protecting the light collecting member.

7. A liquid crystal display device comprising:
a) a back light assembly comprising:
a receiving container;
a light source generating light, the light source received in the receiving container; and
a light diffusion member provided on the light source and including a light diffusing body, an adhesion preventing layer and a light diffusing layer formed on a light exiting surface of the light diffusing body,
the light diffusing body including one of a polymer mixture including a first polymer having a first glass transition temperature and a second polymer having a second glass transition temperature higher than the first glass transition temperature, the first and second polymers uniformly blended within the polymer mixture, and a copolymer of the first polymer and the second polymer as repeating units, the light diffusing body diffusing an incident light through a light incident surface of the light diffusing body which is opposite to the light exiting surface,
the adhesion preventing layer formed on the light exiting surface of the light diffusing body,
wherein the light diffusing layer includes a binder resin having beads; and
b) a display unit provided on the light diffusion member, the display unit changing diffused light into an image light including information.

8. The liquid crystal display device as claimed in claim 7, wherein the first polymer is polyethylene terephthalate and the second polymer is polycarbonate.

9. The liquid crystal display device as claimed in claim 8, wherein the polymer mixture includes about 20-40% by weight of polyethylene terephthalate and about 60-80% by weight of polycarbonate.

10. The liquid crystal display device as claimed in claim 8, wherein the copolymer includes polyethylene terephthalate and polycarbonate polymerized in a mixing ratio of about 1:1.5-4.0 by weight.

11. The liquid crystal display device as claimed in claim 7, wherein a glass transition temperature of the polymer mixture and the copolymer is about or greater than 100° C.

12. The liquid crystal display device as claimed in claim 7, wherein a thickness of the light diffusing body is in a range of from about 0.7 to about 1.2 mm.

* * * * *